UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

COMPOSITION FOR INSULATING MATERIAL.

SPECIFICATION forming part of Letters Patent No. 460,765, dated October 6, 1891.

Application filed August 5, 1889. Serial No. 319,827. (No specimens.)

*To all whom it may concern:*

Be it known that I, ELIHU THOMSON, a citizen of the United States, and a resident of Lynn, in the county of Essex and State of Massachusetts, have invented a certain new and useful Composition for Insulating Material, of which the following is a specification.

My present invention relates to a composition for insulating material which can be molded into form, which is to a great extent fire-resisting or heat-resisting, and which has great strength or toughness so that it can be drilled, tapped, or cut, &c., very much in the same manner as a metallic substance.

The substances entering into the composition of the material are, chiefly, rubber or similar insulating cementing material, asbestus or similar mineral fiber ground into fine powder or otherwise suitably subdivided, and soapstone or similar lubricating material—such, for instance, as talc in fine powder. These three materials are incorporated in a powdered or disintegrated state and molded by heat and great pressure into the form desired, the mixture being very complete and perfectly made. The rubber used may be scrap vulcanized rubber or may be any form of rubber or other material in its natural state, or which has been vulcanized in part or completely, and which is subject to hardening by continued heat under pressure, as in the ordinary vulcanizing or rubber-working processes. If pure rubber be used a suitable amount of vulcanizing material is added with it. A large proportion of asbestus fiber or other similar fiber of a mineral nature and incombustible, and which is also heat non-conducting and electrically a perfect insulator, is preferably employed. The soapstone reduced to a fine state of division before mixing with the other materials, which have also been put into shape for complete admixture, acts as a lubricant, allowing the material to flow under pressure. It also gives body to the material and adds its fire-proof qualities, and at the same time assists in allowing tapping or cutting of the material into shape. The asbestus, being a fire-proof and fibrous material, confers toughness. The rubber is the binding material, which, when vulcanized or hardened and consolidated by great pressure and heat, forms the medium for holding the other particles in place, and gives solidity and body to the whole compound. The proportions may be varied in accordance with the degree of toughness, rigidity, or hardness, or heat-resisting qualities required in each case. Thus, when an excellent finish of exterior is desired in the pieces molded from this composition the proportion of rubber may be increased, while the asbestus is diminished. In cases where great toughness and fire or heat resisting quality are needed the asbestus or soapstone are increased in amount, while the amount of rubber is made as little as possible consistent with proper holding of the rest of the materials together. All of the materials used are insulators. My invention is not restricted to a composition made of these materials alone; but other materials might be added without to any great extent interfering with the properties of the finished product. Thus a moderate proportion of powdered slate or powdered pumice-stone, rotten stone, or other such fine powder might be added, provided the amount is not sufficient to overcome the lubricating quality of the soapstone or talc powder which has been introduced into the composition for the purpose above mentioned. Other binding materials of a similar nature to asbestus may be substituted to give toughness—such as mineral wool, fine-spun glass, &c—while again the rubber in the composition may be either pure rubber or an impure mixture, or there may be substituted for it other materials which soften by heat and yield under pressure or become plastic under pressure, as does the rubber, while it is at all times a high insulator capable of filling the pores of the asbestus and soapstone and capable of being with the other materials rendered slightly yielding or elastic when hot, and assuming its rigidity or toughened form when cold. Even a strong solution of rubber, as a solvent, might be incorporated with the other substances and allowed to dry out, so as to leave the rubber in thorough admixture with the rest of the materials before molding and pressing into shape.

A quantity of the completed material may be introduced in a heated state into a mold made into halves or portions, and pressed together by a powerful hydrostatic press, or it may be pressed between plates in the form of slabs or disks, or in any other suitable form, the heat giving it sufficient elasticity, even when the proportion of binding material—such as vulcanized rubber—is very slight, to cause it to yield under enormous pressures and assume a rigid, tough, solid form outside.

My invention therefore consists in a combination of at least three materials having opposing properties and all insulators electrically, to wit, one a lubricant insulator, as talc or soapstone, another a fibrous material insulator capable of resisting heat, such as asbestus, and the third a material of good insulating quality, becoming plastic under high temperatures and solidifying again when cold, and capable of admixture with the former materials as well as possessed of a good degree of toughness of itself while not being easily softened by heat or set on fire.

On account of its expense it is well to reduce the proportion of rubber to the greatest degree practicable and retain the requisite strength. This proportion may vary from fifteen per cent. to twenty-five per cent., according to the coherence desired in the material, my preference being for about twenty-five per cent., and the proportion of asbestus and soapstone added may be such as will suit the conditions of toughness and rigidity; but in all cases enough soapstone—say five to fifteen per cent.—must be added to allow the material to flow slightly and be plastic in the molds, so as to conform readily to the shape of the molds. As I have stated above, these materials may have added to them other practically inert materials used merely as a filling, the chief properties being conferred by the materials which I have mentioned as constituting the combination of my invention. It is also well to coat the molds with the lubricating material, such as soapstone, before introducing the material to be molded.

What I claim as my invention is—

1. An electrical insulating composition consisting of a fibrous mineral insulator, as a base, a cementing insulating substance, such as rubber, and a lubricator consisting of an insulating material, as and for the purpose described.

2. A composition for an electrical insulating material, consisting of asbestus, rubber, and soapstone, or their insulating equivalents, as described, combined in the manner and for the purposes set forth.

Signed at Lynn, in the county of Essex and State of Massachusetts, this 1st day of August, A. D. 1889.

ELIHU THOMSON.

Witnesses
JOHN W. GIBBONEY,
A. L. ROHRER.